United States Patent
Evans et al.

(10) Patent No.: US 6,253,250 B1
(45) Date of Patent: Jun. 26, 2001

(54) METHOD AND APPARATUS FOR BRIDGING A PLURALITY OF BUSES AND HANDLING OF AN EXCEPTION EVENT TO PROVIDE BUS ISOLATION

(75) Inventors: Keith M. Evans, San Jose; Kevin P. Grundy, Fremont, both of CA (US)

(73) Assignee: Telocity, Incorporated, San Jose, CA (US)

( * ) Notice: Subject to any disclaimer, the term of this patent is extended or adjusted under 35 U.S.C. 154(b) by 0 days.

(21) Appl. No.: 09/340,563

(22) Filed: Jun. 28, 1999

(51) Int. Cl.[7] ............................ G06F 15/16; G06F 15/173
(52) U.S. Cl. ..................... 709/253; 709/225; 709/216; 709/229; 710/27; 710/28; 714/43; 714/44
(58) Field of Search ........................... 709/253, 225, 709/229, 212, 224, 208, 209, 216; 710/22, 23, 27, 28, 54, 37, 38; 714/43, 39, 44, 49

(56) References Cited

U.S. PATENT DOCUMENTS

| | | | | |
|---|---|---|---|---|
| 4,325,120 | * | 4/1982 | Colley et al. | 364/200 |
| 5,732,094 | * | 3/1998 | Petersen et al. | 371/51.1 |
| 5,815,647 | * | 9/1998 | Buckland et al. | 714/3 |
| 5,884,027 | * | 3/1999 | Garbus et al. | 709/250 |
| 5,978,866 | * | 11/1999 | Nain | 710/22 |
| 6,108,778 | * | 8/2000 | LaBerge | 713/1 |

* cited by examiner

Primary Examiner—Zarni Maung
Assistant Examiner—Beatriz Prieto
(74) Attorney, Agent, or Firm—Pennie & Edmonds LLP (57) ABSTRACT

A bus bridge coupled between two bridges providing bus exception event isolation and address/data translation. In one embodiment the bus bridge includes two direct memory access (DMA) engines and a first-in-first-out (FIFO) buffer interface between the DMA engines to provide the bus exception isolation. The DMA engines and FIFOs also enable a packet based message passing architecture, which eliminates the need for address translation and also handles data reordering.

32 Claims, 5 Drawing Sheets

METHOD AND APPARATUS FOR BRIDGING A PLURALITY OF BUSES AND HANDLING OF AN EXCEPTION EVENT TO PROVIDE BUS ISOLATION

BACKGROUND OF THE INVENTION

1. Field of the Invention

The present invention relates to buses generally and, more specifically, the present invention relates to communications between buses.

2. Background Information

A bus can sometimes be considered to be a collection of wires or other transmission media through which data is transmitted. One part of a computer may communicate with another part of the computer or another piece of equipment outside the computer through a bus. A bus bridge provides a connection path between two independent local buses. One function of a bus bridge is to allow transactions to occur or between a master on one bus and a target on the other.

Figure 1:
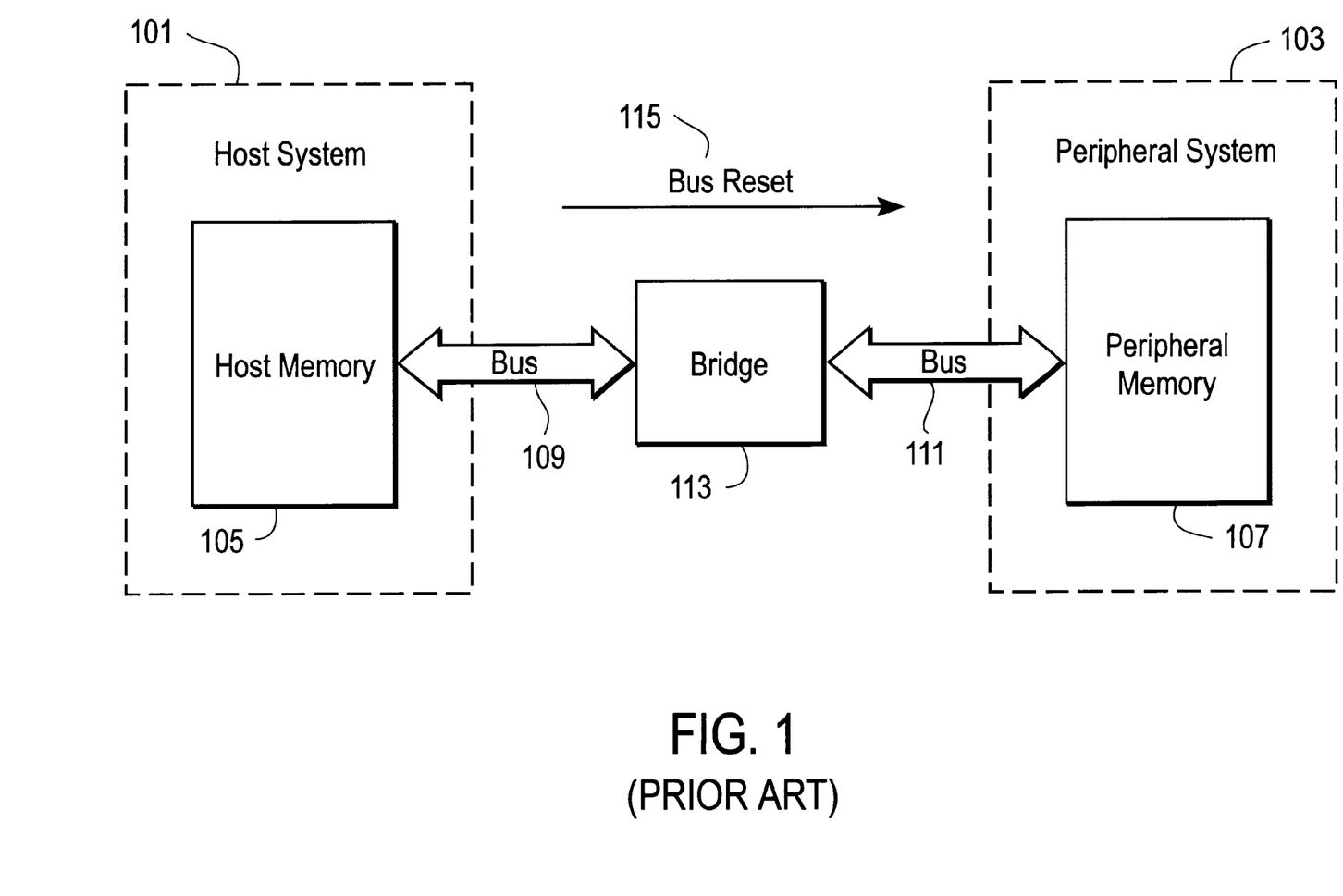
FIG. 1 is a block diagram illustrating a prior art bridge transferring data and bus exception events between buses.

To illustrate, FIG. 1 shows a bus bridge 113 providing a connection path between bus 109 and bus 111. As shown, bus 109 is part of a host system 101 and bus 111 is part of a peripheral system 103. One example of bus 109 may be the Peripheral Component Integration (PCI) bus. In this example, host system 101 may be a personal computer and peripheral system 103 may be a peripheral coupled to the personal computer. The personal computer would be considered the master and would control peripheral system 103. Host memory 105 of host system 101 is accessible by bus 109 and peripheral memory 107 of peripheral system 103 is accessible by bus 111.

With the configuration illustrated in FIG. 1, host system 101 may communicate with peripheral system 103 through bridge 113. Thus, data may be transmitted back and forth between bus 109 and bus 111 through bridge 113. One characteristic of bridge 113 is that because it assumes that host system 101 is the master, bus exceptions, such as a bus reset 115 for example, are also transmitted through bridge 113. Consequently, if bus 109 is reset through bus reset 115, bus 111 is also reset. Activity on peripheral system 103 is reset and interrupted as a result of bus reset 115 from bus 109.

SUMMARY OF THE INVENTION

A bus bridge coupled to transfer data between a first bus and a second bus is disclosed. In one embodiment, the bus bridge includes a first bus exception domain coupled to the first bus such that a bus exception event that occurs in the first bus is limited to the first bus exception domain. The disclosed bus bridge also includes a second bus exception domain coupled between the first bus exception domain and the second bus such that a bus exception event that occurs in the second bus is limited to the second bus exception domain. A first bus exception monitor is included in the first bus exception domain to monitor for a bus exception event that occurs in the second bus. A second bus exception monitor included in the second bus exception domain to monitor for a bus exception event that occurs in the first bus. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A bus bridge coupled to transfer data between a first bus and a second bus and isolate bus exception events is disclosed. The subject of the present invention will be described with reference to numerous details set forth below. The accompanying drawings will illustrate the invention. The following description and drawings are illustrative of the invention and are not to be construed as limiting the invention. Numerous specific details are described to provide a thorough understanding of the present invention. In certain instances, however, well-known or conventional details are not described in order not to obscure the present invention.

One embodiment of the present invention is a bus bridge that allows transactions to occur between a memory on one bus and a memory on another bus. The present invention in one embodiment provides isolation between two buses in a multiprocessor systems such that bus exception events (such as for example but not limited to a bus reset event) do not propagate through the bridge. One embodiment of the present invention provides address and data translation enabling the two buses to use different address spaces and different data ordering conventions. In one embodiment, a bus bridge according to the teachings of present invention includes two direct memory access (DMA) engines and a first-in-first-out (FIFO) buffer interface between them to provide bus exception isolation, and to enable a packet based message passing architecture, which eliminates the need for address translation and also handles data reordering.

Figure 2:
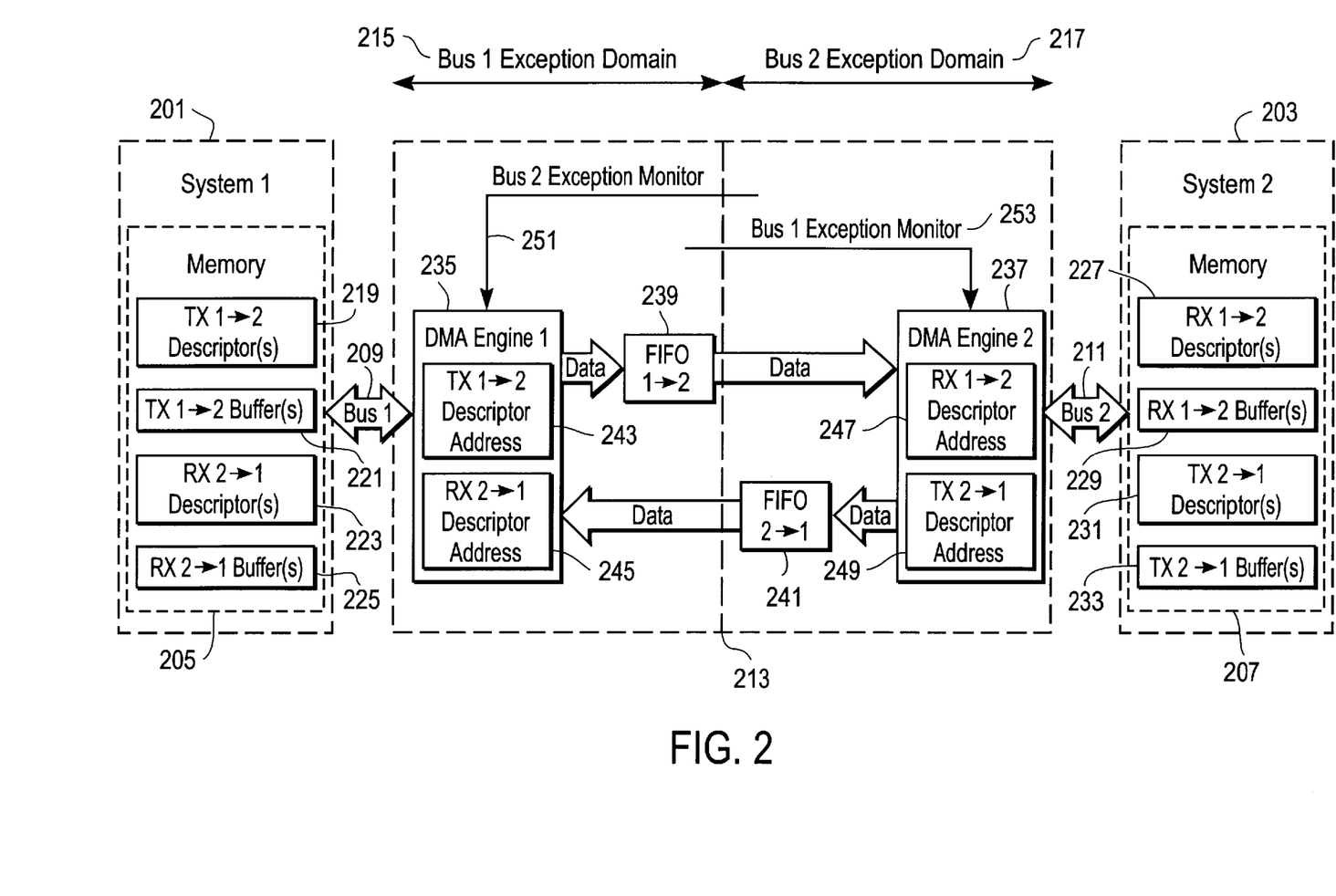
FIG. 2 is a block diagram illustrating one embodiment of a bus bridge isolating bus exception events in accordance with the teachings of the present invention.

FIG. 2 is a block diagram illustrating one embodiment of a bus bridge 213 in accordance with the teachings of the present invention. As illustrated, bridge 213 includes Bus 1 Exception Domain 215 coupled to bus 1 209 and Bus 2 Exception Domain 217 coupled to bus 2 211. In one embodiment, at least one of bus 1 209 and bus 2 211 is a PCI bus or other similar interface bus with a host or master. In one embodiment, the other one of bus 1 209 and bus 2 211 is a peripheral bus. Bus 1 Exception Domain 215 includes DMA Engine 1 235 coupled to FIFO 1→2 239. Bus 2 Exception Domain 217 includes DMA Engine 2 237 coupled to FIFO 2→1 241. DMA Engine 2 237 is coupled to receive data from FIFO 1→2 239. DMA Engine 1 235 is coupled to receive data from FIFO 2→2 241. DMA Engine 1 235 includes a Bus 2 Exception Monitor 251 to monitor for a bus exception event occurring in bus 2 211. DMA Engine 2 237 includes a Bus 1 Exception Monitor 253 to monitor for a bus exception event occurring in bus 1 209. In one embodiment, a bus exception event may include a bus reset event.

In one embodiment, Bus 1 Exception Monitor 253 is coupled to bus 1 209 to monitor a bus exception signal line (not shown) for the bus exception event in bus 1 209 directly. In one embodiment, Bus 2 Exception Monitor 251 is coupled to bus 2 211 to monitor a bus exception signal line (not shown) for the bus exception event in bus 2 211 directly. Thus, Bus 1 Exception Monitor 253 is in one embodiment able to detect a bus exception event in bus 1 209 without having to read completely data packets transferred from bus 1 209. Similarly, Bus 2 Exception Monitor 251 is in one embodiment able to detect a bus exception event in bus 2 211 without having to read completely data packets transferred from bus 2 211.

In one embodiment, bus 1 209 is coupled to system 1 201 and bus 2 211 is coupled to system 2 203. In one embodiment, both system 1 201 and system 2 203 have memories that are accessible via bus 1 209 and bus 2 211, respectively. For example, system 1 201 may be a personal computer including a processor (not shown) such as for example an Intel Pentium family processor, a Motorola PowerPC family processor or the like. In one embodiment, system 2 203 may be a peripheral device connected to system 1 201 through, for example, PCI bus 1 201. As illustrated, system 1 201 in one embodiment includes memory 205, which is accessible by bus 1 209. System 2 203 includes memory 207, which is accessible by bus 2 211.

In accordance with the teachings of the present invention, bus exception events occurring in bus 1 209 are isolated or limited to Bus 1 Exception Domain 215 of bridge 213. Similarly, bus exception events occurring in bus 2 211 are isolated or limited to Bus 2 Exception Domain 217 of bridge 213. Therefore, if a bus exception event such as a bus reset occurs in bus 1 209, bus 2 211 and system 2 203 are not reset in one embodiment. Similarly, if a bus exception event such as a bus reset occurs in bus 2 211, bus 1 209 and system 1 201 are not reset in accordance with the teachings of the present invention.

To illustrate, system 2 203 may be, or may be coupled to, a peripheral device such as for example, but not limited to, a digital telephone, camera, or other input device, storage device, etc. In one embodiment, in order to decrease the likelihood of the peripheral device from suffering an unwanted reset or interruption during operation, bus exception events occurring in bus 1 209 are isolated and are not propagated to bus 2 211 in accordance with the teachings of the present invention. Therefore, a peripheral device such as for example a telephone coupled to system 2 203 would not necessarily be reset during operation, even if a bus reset event occurs in bus 1 209. Hence, such a telephone coupled to system 2 203 would be better suited to serve as a "lifeline" since there is a reduced possibility from being reset.

In one embodiment, memory 205 includes transmit descriptor(s) and transmit buffer(s), which are illustrated in FIG. 2 as TX 1→2 Descriptor(s) 219 and TX 1→2 Buffer(s) 221, respectively. These memory locations are used in one embodiment when transferring data from memory 205 through bus 1 209 to memory 207 through bus 2 211. Memory 205 in one embodiment also includes receive descriptor(s) and receive buffer(s), which are illustrated in FIG. 2 as RX 2→1 Descriptor(s) 223 and RX 2→1 Buffer(s) 225, respectively. These memory locations are used in one embodiment when transferring data from memory 207 through bus 2 211 to memory 205 through bus 1 209.

In one embodiment, memory 207 includes transmit descriptor(s) and transmit buffer(s), which are illustrated in FIG. 2 as TX 2→1 Descriptor(s) 231 and TX 2→1 Buffer(s) 233, respectively. These memory locations are used in one embodiment when transferring data from memory 207 through bus 2 211 to memory 205 through bus 1 209. Memory 207 in one embodiment also includes receive descriptor(s) and receive buffer(s), which are illustrated in FIG. 2 as RX 1→2 Descriptor(s) 227 and RX 1→2 Buffer(s) 229, respectively. These memory locations are used in one embodiment when transferring data from memory 205 through bus 1 209 to memory 207 through bus 2 211.

As illustrated, in one embodiment, DMA Engine 1 235 includes TX 1→2 Descriptor Address 243 and RX 2→1 Descriptor Address 245. The information contained in these locations are used when transmitting data from and receiving data to memory 205, respectively. In one embodiment, DMA Engine 2 237 includes TX 2→1 Descriptor Address 249 and RX 1→2 Descriptor Address 247. The information contained in these locations are used when receiving data to and transmitting data from memory 207, respectively.

The flow diagrams shown in FIGS. 3A–5B illustrate steps performed in accordance with the teachings of the present invention when transmitting messages or data from system 1 201 and system 2 203. It is appreciated that messages or data may also be transferred from memory 207 to memory 205 with the same general process in reverse.

Figure 3A:
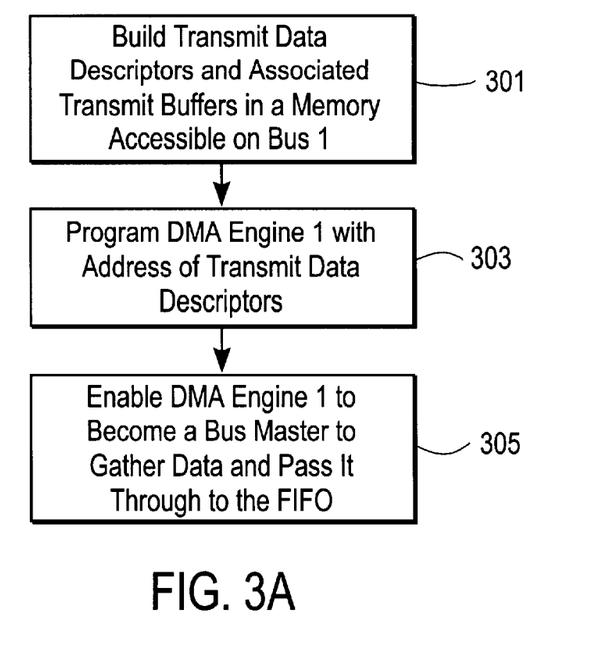
FIGS. 3A and 3B are flow diagrams illustrating one embodiment of steps performed during a transfer of data or messages between buses through a bus bridge in accordance with the teachings of the present invention.
Figure 3B:
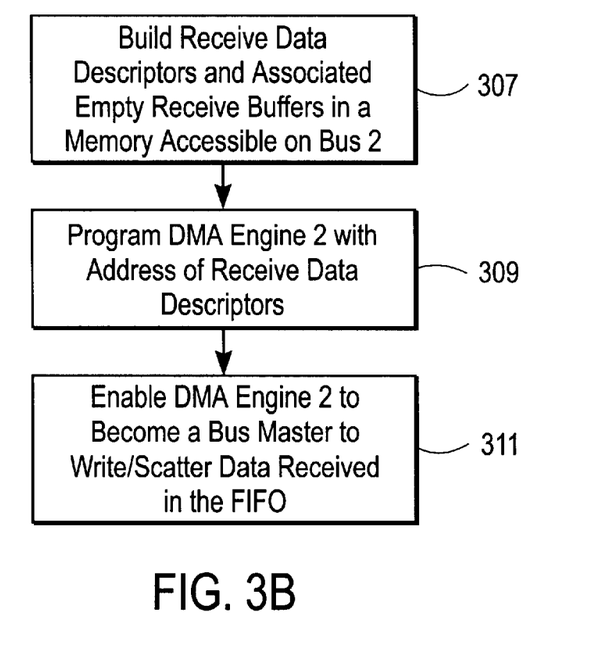

In one embodiment, the steps that shown in FIG. 3A may be performed in parallel with the steps that are shown in FIG. 3B. For example, in one embodiment, the steps shown in FIG. 3A are performed in system 1 201 and the steps shown in FIG. 3B are performed in system 2 203.

Step 301 of FIG. 3A shows that TX 1→2 Descriptor(s) 219 and the associated TX 1→2 Buffer(s) 221 are built in the memory 205. Memory 205 is accessible by bus 1 209. TX 1→2 Buffer(s) 221 are loaded with the message to be sent to system 2 203. In one embodiment, this step may be performed by a processor (not shown) in system 1 201. TX 1→2 Descriptors 219 in one embodiment completely describe and point to the message stored in the TX 1→2 Buffer(s) 221.

Step 303 shows that the TX 1→2 Descriptor Address 235 of DMA Engine 1 235 is programmed with the address of the TX 1→2 Descriptor(s) 219. This enables DMA Engine 1 235 to locate the data to be transferred in memory 205.

Step 305 shows that the DMA Engine 1 235 is then enabled to take control and become bus master of bus 1 209. This enables DMA Engine 1 235 to gather the data loaded in TX 1→2 Buffer(s) 221 and load the data into FIFO 1→2 239.

Step 307 of FIG. 3B shows that RX 1→2 Descriptor(s) 227 and the associated RX 1→2 Buffer(s) 229 are built in memory 207, which is accessible by bus 2 211. That is, receive data descriptors and associated empty receive buffers in memory 207, which are accessible by bus 2 211, are allocated to receive in one embodiment an arbitrary number of receive messages. In detail, this means that in one embodiment, space is allocated in memory 207 for RX 1→2 Buffer(s) 229 and RX 1→2 Descriptor(s) 227 are built to point to the RX 1→2 Buffer(s) 229. In one embodiment, this step may be performed by a processor (not shown) in system 2 203.

Step 309 shows that the RX 1→2 Descriptor Address 247 of DMA Engine 2 237 is programmed with the address of the RX 1→2 Descriptor(s) 227. This enables DMA Engine 2 237 to locate the locations allocated in memory 207 to write or scatter the data read from memory 205.

Step 311 shows that the DMA Engine 2 237 is then enabled to take control and become bus master of bus 2 211.

This enables DMA Engine 2 235 in one embodiment to write or scatter the messages received from FIFO 1→2 239 into the RX 1→2 Buffer(s) 229.

Figure 4:
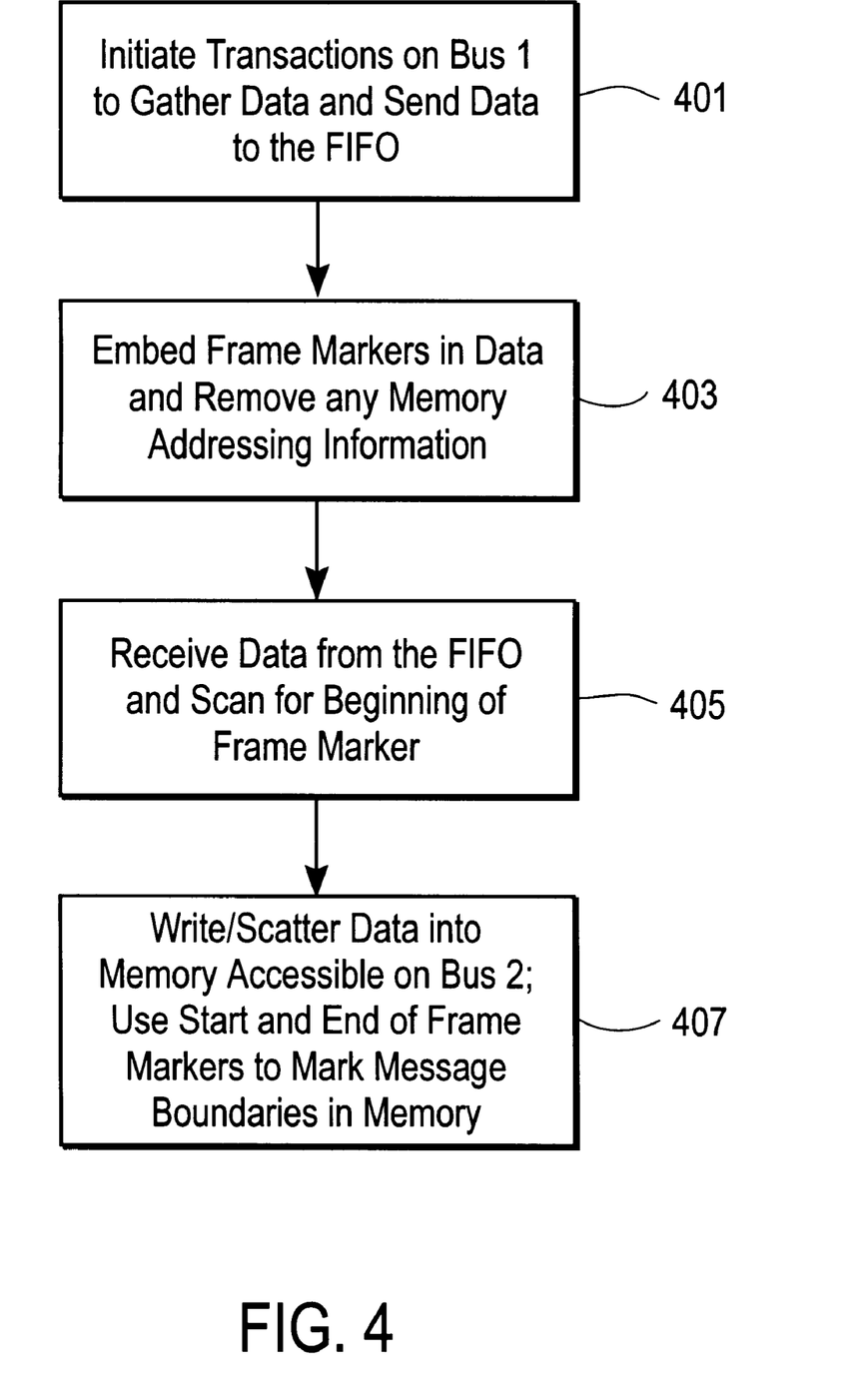
FIG. 4 is a flow diagram illustrating one embodiment of additional steps performed during a transfer of data or messages between buses through a bus bridge in accordance with the teachings of the present invention.

Step 401 of FIG. 4 shows that in one embodiment, transactions are initiated on bus 1 209 to gather data or messages and send the data or messages to FIFO 1→2 239. In one embodiment, this step may be performed by DMA Engine 1 235.

Step 403 shows that frame markers such as for example beginning of frame and end of frame makers are embedded into the data in FIFO 1→2 239 and that any memory addressing information is removed. That is, in one embodiment, once the message or data has been loaded in FIFO 1→2 239, it has become a pure data stream and does not contain addressing information for system 1 201 nor system 2 203. As a result, one embodiment of the present invention provides address and data translation of data transferred between system 1 201 and system 2 203. In one embodiment, this step may be performed by DMA Engine 1 235.

Step 405 shows that the data from FIFO 1→2 239 is then received and then scanned for a beginning of frame marker. In one embodiment, this step may be performed by DMA Engine 2 237

Step 407 shows that the data from FIFO 1→2 239 is then written or scattered into RX 1→2 Buffer(s). In one embodiment, DMA Engine 2 237 begins this step after the beginning of frame marker has been scanned in FIFO 1→2 239. In one embodiment, the beginning and end of frame markers embedded in the data are used by DMA Engine 2 237 to mark message boundaries in memory 207.

In one embodiment, it is appreciated that the above-described building of data structures (e.g. TX 1→2 Descriptor(s) 219, TX 1→2 Buffer(s) 221, RX 2→1 Descriptor(s) 223, RX 2→1 Buffer(s) 225, RX 1→2 Descriptor(s) 227, RX 1→2 Buffer(s) 229, TX 2→1 Descriptor(s) 231 and TX 2→1 Buffer(s) 233) are completely decoupled. For instance, system 2 203 may build data descriptors before or after system 1 201 builds its data structures and DMA Engine 1 235 is enabled. Moreover, the number of descriptors and the sizing of the data buffers may be completely different in memories 205 and 207.

Figure 5A:
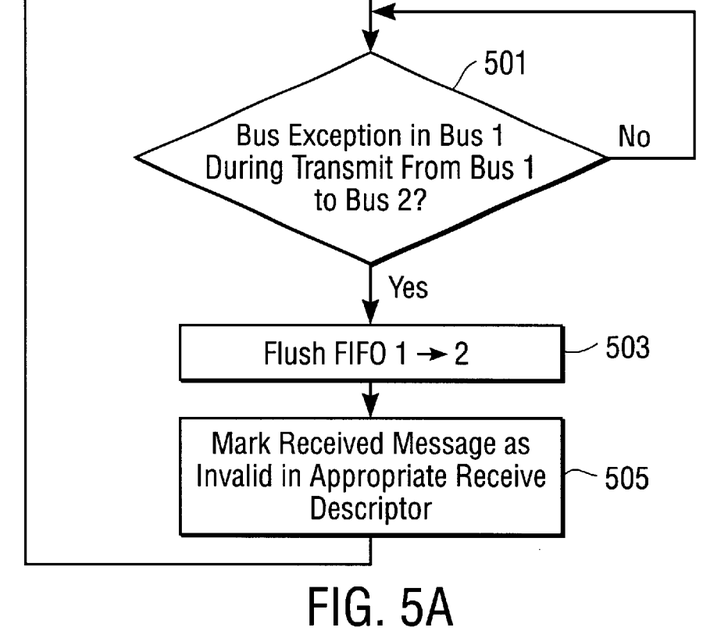
FIGS. 5A and 5B are flow diagrams illustrating one embodiment of still more steps performed during a transfer of data or messages between buses through a bus bridge in accordance with the teachings of the present invention.
Figure 5B:
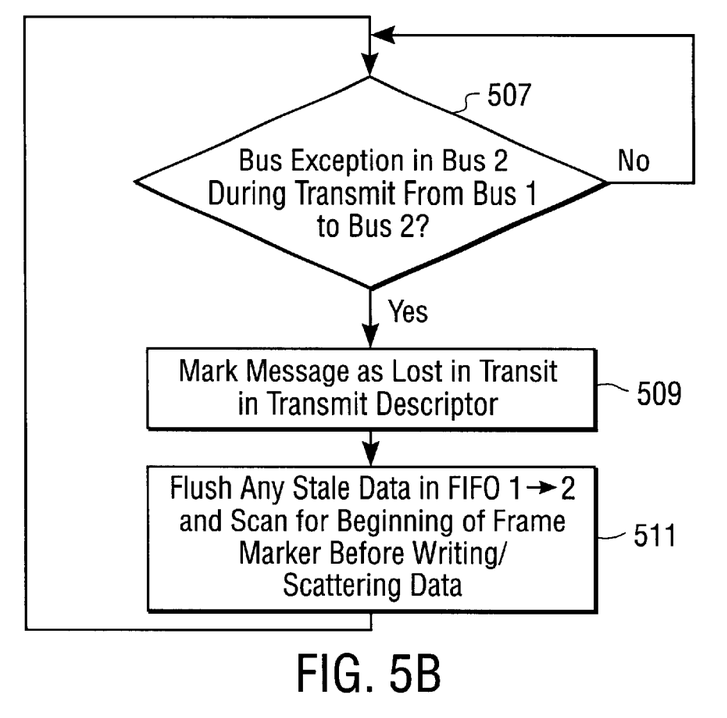

FIGS. 5A and 5B are flow diagrams illustrating one embodiment of the steps performed when bus exception events occur in accordance with the teachings of the present invention. In particular, FIG. 5A shows steps that are performed when there is a bus exception in bus 1 during the transmission from bus 1 209 to bus 2 211. FIG. 5B show steps that are performed when there is a bus exception in bus 2 during the transmission of data from bus 1 209 to bus 2 211.

Decision step 501 of FIG. 5A indicates the decision of whether a bus exception event occurs in bus 1 209 during the transmission of data from bus 1 209 to bus 2 211. If so, step 503 shows that FIFO 1→2 239 is flushed and the received message is marked as invalid in the appropriate RX 1→2 Descriptor(s) 227, as shown in step 505. If there is no bus exception in bus 1 during the transmit from bus 1 to bus 2, then processing loops back to decision step 501. In one embodiment, an interrupt may be generated in system 2 203 in case any additional action is to be taken.

Decision step 507 of FIG. 5B indicates the decision of whether a bus exception event occurs in bus 2 211 during the transmission of data from bus 1 209 to bus 2 211 If so, step 509 shows that the message is marked as lost in transit in the appropriate TX 1→2 Descriptor(s) 219. In one embodiment, an interrupt may be generated in system 1 201 in case any additional action is to be taken. Step 511 shows that after system 2 203 has recovered from the bus exception event and DMA Engine 2 237 is brought back online, any stale data in FIFO 1→2 239 is flushed while FIFO 1→2 is scanned by DMA engine 2 237 for a beginning of frame marker. If no bus exception event occurs in bus 2 211 during the transmission of data from bus 1 209 to bus 2 211, processing loops back to decision step 507.

In one embodiment, the status of all associated transmit descriptors 219 are updated after DMA engine 1 235 has transmitted the data. Similarly, the status of all of the associated receive descriptors 227 are updated after DMA engine 2 237 has written or scattered the data. In one embodiment, the byte ordering of any data in the FIFOs 239 and 241 is constant. In one embodiment, DMA Engine 1 235 and DMA Engine 2 237 reorder the data if system 1 201 or system 2 203, respectively, require a different data ordering than that specified in the FIFOs 239 or 241. Therefore, DMA Engine 1 235, DMA Engine 2 237, FIFO 1→2 239 and FIFO 2→1 241 as described provide packet based message passing architecture, which eliminates the need for address translation and also handles data reordering in accordance with the teachings of the present invention.

The foregoing description has provided numerous examples of the present invention. It will be appreciated that various modifications and changes may be made thereto without departing from the broader spirit and scope of the invention as set forth in the appended claims.

What is claimed is:

1. A bus bridge coupled to transfer data between a first bus and a second bus, comprising:
   a first bus exception domain coupled to the first bus such that a bus exception event that occurs in the first bus is limited to the first bus exception domain;
   a second bus exception domain coupled between the first bus exception domain and the second bus such that a bus exception event that occurs in the second bus is limited to the second bus exception domain;
   a first bus exception monitor included in the first bus exception domain to monitor for the bus exception event that occurs in the second bus; and
   a second bus exception monitor included in the second bus exception domain to monitor for the bus exception event that occurs in the first bus.

2. The bus bridge described in claim 1 further comprising:
   a first direct memory access (DMA) engine included in the first bus exception domain and coupled to the first bus; and
   a second DMA engine included in the domain bus exception domain and coupled between the first DMA engine and the second bus.

3. The bus bridge described in claim 2 further comprising:
   a first buffer included in the first bus exception domain coupled between the first DMA engine and the second DMA engine such that data is to be transferred from the first bus through the first buffer to the second bus; and
   a second buffer included in the second bus exception domain coupled between the second DMA engine and the first DMA engine such that data is to be transferred from the second bus through the second buffer to the first bus.

4. The bus bridge described in claim 3 wherein the first and second buffers are first in first out (FIFO) buffers.

5. The bus bridge described in claim 2 wherein the first DMA engine includes a first transmit descriptor address to point to a first transmit descriptor to be accessed from a first memory over the first bus to transfer data from the first bus to the second bus, the first transmit descriptor to point to a first transmit data buffer in the first memory.

6. The bus bridge described in claim 2 wherein the first DMA engine includes a first receive descriptor address to point to a first receive descriptor to be accessed from a first memory over the first bus to transfer data from the second bus to the first bus, the first receive descriptor to point to a first receive data buffer in the first memory.

7. The bus bridge described in claim 2 wherein the second DMA engine includes a second transmit descriptor address to point to a second transmit descriptor to be accessed from a second memory over the second bus to transfer data from the second bus to the first bus, the second transmit descriptor to point to a second transmit data buffer in the second memory.

8. The bus bridge described in claim 2 wherein the second DMA engine includes a second receive descriptor address to point to a second receive descriptor to be accessed from a second memory over the second bus to transfer data from the first bus to the second bus, the second receive descriptor to point to a second receive data buffer in the second memory.

9. The bus bridge described in claim 3 wherein data to be transferred from the first bus through the first buffer to the second bus is formatted as a data stream with embedded frame markers free of memory addressing information.

10. The bus bridge described in claim 9 wherein the embedded frame markers include a start of frame marker and an end of frame marker.

11. The bus bridge described in claim 3 wherein data to be transferred from the second bus through the second buffer to the first bus is formatted as a data stream with embedded frame markers free of memory addressing information.

12. The bus bridge described in claim 5 wherein a lost in transit indicator is to be set in the first transmit descriptor if the bus exception event occurs in the second bus during the transfer of data from the first bus to the second bus.

13. The bus bridge described in claim 6 wherein an invalid data indicator is to be set in the first receive descriptor if the bus exception event occurs in the second bus during the transfer of data from the second bus to the first bus.

14. The bus bridge described in claim 1 wherein at least one of the first and second buses is a peripheral component interconnect (PCI) bus.

15. The bus bridge described in claim 1 wherein the bus exception event is a bus reset event.

16. A method of transferring data between a first bus and a second bus, the method comprising the steps of:
   reading data from a first memory over the first bus;
   writing the data read from the first memory into a second memory over the second bus;
   isolating from the second bus a bus exception event that occurs in the first bus; and
   setting an invalid data indicator in a receive descriptor in the second memory if the bus exception event occurs in the first bus during the step of reading the data from the first memory.

17. The method of transferring data between the first bus and the second bus described in claim 16 including the additional steps of:
   isolating from the first bus a bus exception event that occurs in the second bus; and
   setting a lost in transit indicator in a transmit descriptor in the first memory if the bus exception event occurs in the second bus during the step of writing the data read from the first memory.

18. The method of transferring data between the first bus and the second bus described in claim 16 including the additional steps of:
   reading data from the second memory over the second bus;
   writing the data read from the second memory into the first memory over the first bus;
   isolating from the first bus a bus exception event that occurs in the second bus; and
   setting an invalid data indicator in a receive descriptor in the first memory if the bus exception event occurs in the second bus during the step of reading the data from the second memory.

19. The method of transferring data between the first bus and the second bus described in claim 18 including the additional step of setting a lost in transit indicator in a transmit descriptor in the second memory if the bus exception event occurs in the first bus during the step of writing the data read from the second memory.

20. The method of transferring data between the first bus and the second bus described in claim 16 wherein the step of setting the invalid data indicator in the receive descriptor in the second memory if the bus exception event occurs in the first bus includes the step of monitoring for the bus exception event that occurs in the first bus.

21. The method of transferring data between the first bus and the second bus described in claim 18 wherein the step of setting the invalid data indicator in the receive descriptor in the first memory if the bus exception event occurs in the second bus includes the step of monitoring for the bus exception event that occurs in the second bus.

22. The method of transferring data between the first bus and the second bus described in claim 16 wherein at least one of the first and second buses is a peripheral component interconnect (PCI) bus.

23. The method of transferring data between the first bus and the second bus described in claim 16 wherein the bus exception event that occurs in the first bus is a bus reset event.

24. The method of transferring data between the first bus and the second bus described in claim 16 wherein the step of reading data from the first memory over the first bus includes the steps of:
   building a transmit descriptor in the first memory, the transmit descriptor to describe the data to be read from the first memory;
   loading an address into a direct memory access (DMA) engine of the transmit descriptor in first memory;
   enabling the DMA engine to become master of the first bus to read the data from the first memory.

25. The method of transferring data between the first bus and the second bus described in claim 24 including the additional step of writing the data read the first memory into a first in first out (FIFO) buffer, the step of writing the data from the first memory into the FIFO to be performed before the step of writing the data read from the first memory into the second memory over the second bus.

26. The method of transferring data between the first bus and the second bus described in claim 25 including the additional step of embedding frame markers into the data written into the FIFO, the embedded frame markers include a start of frame marker and an end of frame marker.

27. The method of transferring data between the first bus and the second bus described in claim 26 including the step of scanning the FIFO for the start of frame marker such that the step of writing the data read from the first memory into a second memory over the second bus is performed after the start of frame marker is scanned from the FIFO.

28. The method of transferring data between the first bus and the second bus described in claim 16 wherein the step of writing the data read from the first memory into the second memory over the second bus includes the steps of:

allocating space in the second memory to write the data read from the first memory;

building a receive descriptor in the second memory, the receive descriptor to describe where space has been allocated to write the data read from the first memory;

loading an address into a direct memory access (DMA) engine of the receive descriptor in second memory;

enabling the DMA engine to become master of the second bus to write the data read from the first memory.

29. An apparatus comprising:

a first memory coupled to a first bus;

a first direct memory access (DMA) engine coupled to the first bus;

a first first in first out (FIFO) buffer coupled to the first DMA engine such that the first DMA engine is to read data from the first memory through the first bus into the first FIFO;

a second DMA engine coupled between the first FIFO and a second bus; and a second memory coupled to the second bus such that the second DMA engine is to read the data from the first FIFO and write the data into the second memory.

30. The apparatus of claim 29 further comprising a second FIFO coupled between the first and second DMA engines such that the second DMA engine is to read data from the second memory through the second bus into the second FIFO and the first DMA engine is to read the data from the second FIFO and write the data into the first memory.

31. The apparatus of claim 30 further comprising:

a first bus exception domain coupled to the first bus, the first bus exception domain including the first DMA engine and the first FIFO; and a second bus exception domain coupled between the first bus exception domain and the second bus, the second bus exception domain including the second DMA engine and the second FIFO, wherein the a bus exception event occurring in either one of the first and second bus exception domains is isolated from occurring in the other one of the bus exception domains.

32. The apparatus of claim 31 further comprising:

a first bus exception monitor included in the first DMA engine to monitor for a bus exception event in the second bus exception domain; and a second bus exception monitor included in the second DMA engine to monitor for a bus exception event in the first bus exception domain.

* * * * *